US012646211B2

(12) United States Patent
Norris et al.

(10) Patent No.: US 12,646,211 B2
(45) Date of Patent: Jun. 2, 2026

(54) MULTI-MODAL TRACKING OF AN INPUT DEVICE

(71) Applicant: Apple Inc., Cupertino, CA (US)

(72) Inventors: Jeffrey S. Norris, Saratoga, CA (US); Michael J. Rockwell, Palo Alto, CA (US); Tony Kobayashi, Berkeley, CA (US); William D. Lindmeier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 266 days.

(21) Appl. No.: 18/408,804

(22) Filed: Jan. 10, 2024

(65) Prior Publication Data

US 2024/0144533 A1     May 2, 2024

Related U.S. Application Data

(63) Continuation of application No. PCT/US2022/037235, filed on Jul. 15, 2022.

(60) Provisional application No. 63/224,617, filed on Jul. 22, 2021.

(51) Int. Cl.
*G06T 7/80* (2017.01)
(52) U.S. Cl.
CPC ...... *G06T 7/80* (2017.01); *G06T 2207/10028* (2013.01); *G06T 2207/30244* (2013.01)
(58) Field of Classification Search
None
See application file for complete search history.

(56) References Cited

U.S. PATENT DOCUMENTS

| | | | |
|---|---|---|---|
| 8,142,288 | B2 | 3/2012 | Zalewski |
| 8,937,489 | B2 | 1/2015 | Park et al. |
| 10,809,910 | B2 | 10/2020 | Iglesias et al. |
| 10,838,515 | B1 | 11/2020 | Yitzhak et al. |
| 2018/0364853 | A1 | 12/2018 | Pahuyd et al. |
| 2019/0113966 | A1 | 4/2019 | Connellan et al. |
| 2020/0387240 | A1 | 12/2020 | Munakata et al. |
| 2020/0389691 | A1 | 12/2020 | Yoshizawa et al. |

OTHER PUBLICATIONS

European Patent Office (ISA/EP), International Search Report and Written Opinion of the International Searching Authority, International Application No. PCT/US2022/037235, 13 pages, Oct. 20, 2022.

*Primary Examiner* — David Ometz
(74) *Attorney, Agent, or Firm* — Thompson Hine LLP

(57) ABSTRACT

Various implementations disclosed herein include devices, systems, and methods that track a movement of an input device. For example, an example process may include determine a pose of a tracking device in a physical environment based on first sensor data from an image sensor. The process then may receive, from the tracking device, first positional data corresponding to a first relative positioning between the tracking device and an input device in the physical environment, where the first positional data is determined based on second sensor data obtained via a sensor on the tracking device. The process then may track movement of the input device in the physical environment based at least in part on the first positional data and the pose of the tracking device. The process then may determine an input for the electronic device based at least in part on tracking the movement of the input device.

22 Claims, 7 Drawing Sheets

200A

105

120

212

122

124

140

200B

105

120

212

224

122    222

124

140

500

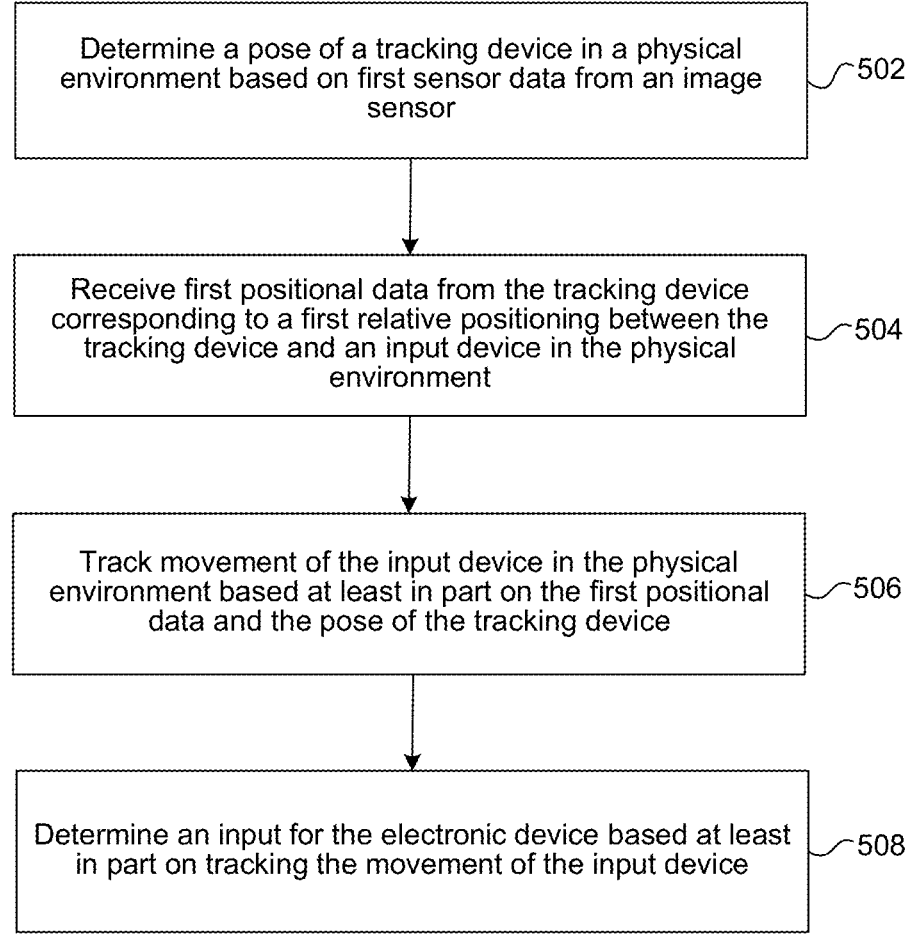

Determine a pose of a tracking device in a physical environment based on first sensor data from an image sensor ⟋502

Receive first positional data from the tracking device corresponding to a first relative positioning between the tracking device and an input device in the physical environment ⟋504

Track movement of the input device in the physical environment based at least in part on the first positional data and the pose of the tracking device ⟋506

Determine an input for the electronic device based at least in part on tracking the movement of the input device ⟋508

MULTI-MODAL TRACKING OF AN INPUT DEVICE

CROSS-REFERENCE TO RELATED APPLICATIONS

This application is a continuation of International Application No. PCT/US2022/037235 filed Jul. 15, 2022, which claims priority to U.S. Provisional Application No. 63/224, 617 filed Jul. 22, 2021, entitled "MULTI-MODAL TRACK-ING OF AN INPUT DEVICE," each of which is incorpo-rated herein by this reference in its entirety.

TECHNICAL FIELD

The present disclosure generally relates to systems, meth-ods, and devices for tracking movement of an input device by an electronic device using a tracking device.

BACKGROUND

Visual object tracking is a fundamental task in computer vision technologies. For example, an input device (e.g., a pencil, a wand, a hand worn device, etc.) may be tracked by estimating three-dimensional (3D) positional data from images of a physical environment to determine the move-ment of the input device (e.g., a user moving the pencil in a virtual writing application). However, if the input device is occluded (e.g., blocked) from the view of the electronic device, then the system may not operate properly. Thus, it may be desirable to accurately track a device using computer vision in a way that accounts for circumstances in which the device is occluded or otherwise not visible.

SUMMARY

Some implementations disclosed herein provide systems and methods for using image data (e.g., optical tracking) of an electronic device (e.g., an HMD) to identify and track an input device (e.g., a pencil) using a tracking device. For example, the tracking device may be a third electronic device (e.g., a dock/docking station) sitting on a desktop and relatively stationary during a tracking process. The tracking device may use magnetic or optical tracking to track the position of the non-stationary input device (e.g. a pencil), whose movement provides input to the electronic device (e.g., a non-stationary HMD). For example, the HMD iden-tifies input based on tracking movement of the input device based on determining a relative positioning between the HMD and a tracking device transmitter (e.g., using image data) and combining that information with the relative positioning between the tracking device and the input device based on positional data obtained by the tracking device. The HMD may use image/depth data to identify both the input device and the tracking device to (a) improve accuracy, and (b) enable the system to continue tracking the input device when one of the other devices is occluded in its sensor data.

In general, one innovative aspect of the subject matter described in this specification can be embodied in methods, at an electronic device that includes a processor, that include the actions of determining a pose of a tracking device in a physical environment based on first sensor data from an image sensor, receiving, from the tracking device, first positional data corresponding to a first relative positioning between the tracking device and an input device in the physical environment, wherein the first positional data is determined based on second sensor data obtained via a sensor on the tracking device, tracking movement of the input device in the physical environment based at least in part on the first positional data and the pose of the tracking device, and determining an input for the electronic device based at least in part on tracking the movement of the input device.

These and other embodiments can each optionally include one or more of the following features.

In some aspects, the first positional data represents a 6 degrees of freedom pose of the input device relative to the tracking device, and wherein the sensor on the tracking device comprises a magnetic tracker. In some aspects, the pose of the tracking device represents a 6 degrees of freedom pose in the physical environment, and wherein the image sensor is located on the electronic device or on the tracking device.

In some aspects, determining the pose of the tracking device includes determining a pose of the electronic device in the physical environment, obtaining, based at least in part on the first sensor data, second positional data corresponding to a second relative positioning between the electronic device and the tracking device in the physical environment, and determining the pose of the tracking device based at least in part on the pose of the electronic device and the second positional data.

In some aspects, receiving the first positional data com-prises receiving updated first positional data corresponding to updated first relative positioning between the tracking device and the input device in the physical environment, and wherein tracking movement of the input device is based at least in part on the updated first positional data and the pose of the tracking device. In some aspects, the tracking device is stationary during the tracking and the electronic device is not stationary during the tracking.

In some aspects, tracking the movement of the input device includes during a first period during which the tracking device is visible in third sensor data obtained via a sensor of the electronic device and the input device is not visible in the third sensor data, tracking the movement of the input device based on identifying the tracking device in the third sensor data, and during a second period during which the tracking device is not visible in the third sensor data and the input device is visible in the third sensor data, tracking the movement of the input device based on identifying the input device in the third sensor data.

In some aspects, the method further includes detecting a change in the pose of the tracking device, and in accordance with detecting the change in the pose, determining an updated pose of the tracking device in the physical envi-ronment based on fourth sensor data from the image sensor.

In some aspects, the tracking device comprises an accel-erometer or an inertial measurement unit (IMU), and wherein detecting the change in the pose of the tracking device comprises receiving, from the tracking device, an indication that the tracking device has moved based on sensor data from the accelerometer or the IMU. In some aspects, the input device includes a stylus or a wearable device.

In some aspects, the method further includes defining a workspace, wherein the workspace corresponds to a two-dimensional (2D) area or three-dimensional (3D) volume of space within the physical environment. In some aspects, defining the workspace is based at least in part on the determined input. In some aspects, the 2D area or 3D volume is predefined relative to the pose of the tracking device.

In some aspects, the tracking device is positioned on a flat surface, and wherein defining the workspace is based at least in part on open portions of the flat surface. In some aspects, the tracking device includes a dock for the input device, and wherein defining the workspace is performed in response to the input device being removed from the dock.

In some aspects, the tracking device includes a case for the input device, and wherein defining the workspace is performed in response to the case being opened.

In some aspects, the tracking device comprises a flexible mat, and wherein defining the workspace is performed in response to the mat being unrolled. In some aspects, the mat comprises a touch sensor, and wherein the method further comprises determining a second input for the electronic device based on sensor data from the touch sensor.

In some aspects, the method further includes providing an extended reality (XR) environment, the XR environment presenting content or enabling input based on the workspace. In some aspects, the electronic device is a head mounted device (HMD).

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 5 is a flowchart representation of an exemplary method that determines an input for an electronic device based on tracking the movement of an input device via a tracking device in accordance with some implementations.

Figure 1:
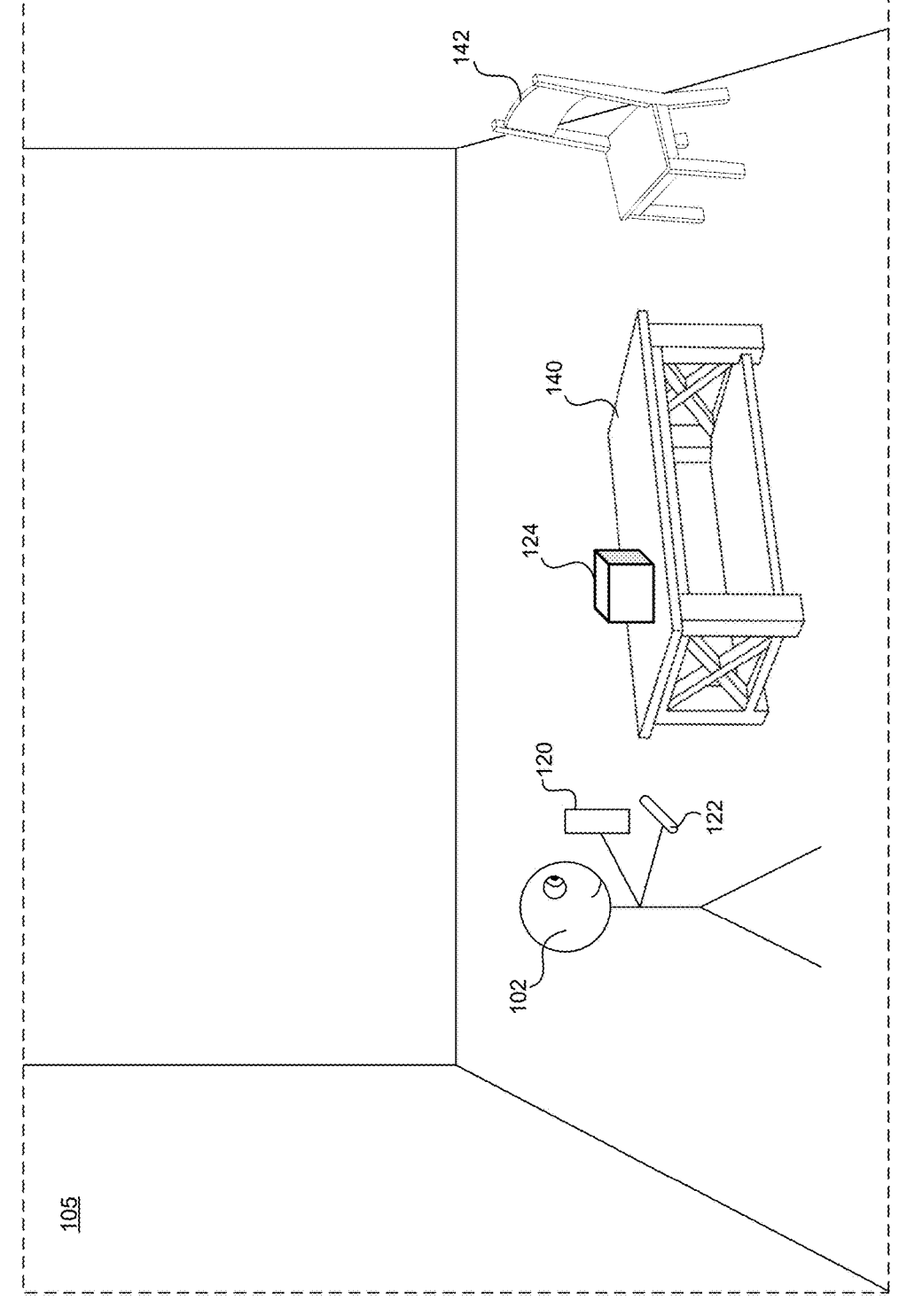
FIG. 1 is an example of an electronic device, an input device, and a tracking device used within a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous specific details are provided herein to afford those skilled in the art a thorough understanding of the claimed subject matter. However, the claimed subject matter may be practiced without these details. In other instances, methods, apparatuses, or systems, that would be known by one of ordinary skill, have not been described in detail so as not to obscure claimed subject matter.

FIG. 1 illustrates an exemplary operating environment 100 in accordance with some implementations. In this example, the example operating environment 100 involves an exemplary physical environment 105 that includes physical objects (e.g., furniture) such as table 140 and chair 142. The physical environment 105 includes user 102 holding device 120, such as a smart phone or tablet, and the user 102 is holding an input device 122 (e.g., a writing utensil such as a pencil, a wand, etc.). Additionally, physical environment 105 includes a tracking device 124 that is located on a surface of the table 140.

In some implementations, the device 120 can be a wearable device, such as a near-eye device. In some implementations, the device 120 is a handheld electronic device (e.g., a smartphone or a tablet). The device 120 utilizes one or more display elements to present views. For example, the device 120 can display views that include content in the context of an extended reality (XR) environment. In some implementations, the device 120 may enclose the field-of-view of the user 102. In some implementations, the functionalities of device 120 are provided by more than one device. In some implementations, the device 120 communicates with a separate controller or server to manage and coordinate an experience for the user. Such a controller or server may be located in or may be remote relative to the physical environment 105.

In some implementations, content displayed by the device 120 may be a visual 3D environment (e.g., an extended reality (XR) environment), and visual characteristics of the 3D environment may continuously change. Inertial head pose measurements may be obtained by the inertial measurement unit (IMU) or other tracking systems. In one example, a user can perceive a real-world environment while holding, wearing, or being proximate to an electronic device that includes one or more sensors that obtains physiological data to assess an eye characteristic that is indicative of the user's gaze characteristics, and motion data of a user.

In some implementations, a visual characteristic is displayed as a feedback mechanism for the user that is specific to the views of the 3D environment (e.g., a visual or audio cue presented during the viewing). In some implementations, viewing the 3D environment can occupy the entire display area of the display. For example, the content displayed may be a sequence of images that may include visual and/or audio content presented to the user (e.g., 360-degree video on an HMD).

In some implementations, the device 120 includes sensors for acquiring image data of the physical environment (e.g., as the user 102 views the environment). The image data can include light intensity image data and/or depth data. For example, a sensor may be a video camera for capturing RGB data, and a sensor may be a depth sensor (e.g., a structured light, a time-of-flight, or the like) for capturing depth data. The image sensors may include a first light intensity camera that acquires light intensity data for the left eye viewpoint and a second light intensity camera that acquires light intensity data for the right eye viewpoint of the physical environment. Additionally, the image sensors may include a first depth camera that acquires depth image data for the left eye viewpoint and a second depth camera that acquires depth image data for the right eye viewpoint of the physical environment. Alternatively, one depth sensor is utilized for both depth image data for the left eye viewpoint and the right eye viewpoint. Thus, the depth data is equivalent. Alternatively, the depth data can be determined based on the light intensity image data, thus not requiring a depth sensor.

In some implementations, the device 120 has a graphical user interface (GUI), one or more processors, memory and one or more modules, programs or sets of instructions stored in the memory for performing multiple functions. In some implementations, the user 102 interacts with the GUI. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

Input device 122 is an example of one type of a non-stationary object used as an input mechanism that may be utilized to manipulate and/or interact with objects (e.g., virtual objects within a workspace) as part of an XR environment that is presented to the user 102 on a display of device 120. Input device 122 may be a pencil, a wand, a finger-worn device, and the like. The movement of the input device 122 may be optically tracked (e.g., via on or more images sensor(s)) by the device 120. However, if the input device 122 is occluded, or if a view of the image sensors of the device 120 does not include the input device 122, then the functionality of the input device 122 may be hindered (e.g., latency issues), or may not work, thus another device, such as tracking device 124, can additionally or alternatively be used to track the movement of the input device 122.

Tracking device 124 (also referred to as a docketing station or a dock) is a relatively stationary device (e.g., plugged in and resting on top of table 140 during use) that includes a transmitter and is in electronic communication with the device 120. In some implementations, tracking device 124 magnetically tracks, via a magnetic sensor, one or more input accessories, such as input device 122. Tracking device 124 tracks a location of the input device 122 during movement, and can provide the location (e.g., 3D coordinates) of the input device within the physical environment 105. In some implementations, the magnetic sensor of the tracking device 124 may include a single coil that can track an offset distance between the tracking device 124 and the input device 122. In some implementations, the magnetic sensor of the tracking device 124 may include three coils that can track the input device 122 in six degrees of freedom (6DoF).

In some implementations, tracking device 124 includes an accelerometer that provides data to the device 120 to determine if tracking device 124 has moved. Additionally or alternatively, device 120 can determine that tracking device 124 has moved optically (e.g., based on acquired image data). If there is an occlusion (e.g., an object blocking a view of tracking device 124), then the electronic communication between tracking device 124 and device 120 may be utilized to read the accelerometer data. The electronic communication between tracking device 124 and device 120 via a transmitter on the tracking device 124 may be any type of wireless communication protocol that would not be disrupted by an occluding object (e.g., WiFi, Bluetooth, Zigbee, GPS data, and the like).

In some implementations, tracking device 124 includes sensors for table-top sensing to calibrate a "work surface" in a 2D or 3D space. The work surface, as used herein, refers to a working area as designated by the device 120 and/or tracking device 124 of where the user can interact within the XR environment (e.g., the user can use a writing application to virtually draw/write). The table-top sensing sensors may include an IMU to detect surface intersections. Generally, an IMU is a computing device that provides inertial data by sampling signals generated by one or more sensors of the IMU. The one or more sensors may include: one-to-tri-axial accelerometers for measuring changes in velocity along one to three axes, one-to-tri-axial axis gyroscopes for measuring angular velocity about one to three axes, one-to-tri-axial magnetometers for measuring information regarding magnetic fields relative to one to three axes, a barometric pressure sensor for measuring atmospheric pressure, and the like.

In some implementations, the tracking device 124 may include interference sensors, such as infrared (IR) sensors (e.g., an IR laser) that can track the input device 122 with higher precision. For example, higher precision may be required to more accurately track a user writing on the work surface. In some implementations, the tracking device 124 may include light intensity based cameras and/or depth cameras for tracking device 120, input device 122, or both.

In some implementations, the tracking device 124 includes an input device that is configured to receive at least one input that is defined by a characteristic of an interaction with the tracking device 124. In some implementations, the tracking device 124 is (or includes) a flexible mat that can be rolled/unrolled (e.g., to take up less room if traveling, such as an airplane tray). For example, the tracking device 124 may be a capacitive based flexible mat (or pad) that may include functional buttons, slide bars, and the like. The tracking device 124 as a flexible mat may then be "activated" by unrolling it such that the device 120 detects the tracking device 124 is unrolled. In some implementations, the tracking device 124 (as a flexible mat or any other configuration) can detect when a user touches a surface of the tracking device 124 to sense a user writing either with the input device 122 or by the touch of the user. For example, if the tracking device 124 is a flexible touchpad, a characteristic of an interaction with the input device may include a duration of time in which an object (e.g., input device 122) remained in contact with the touchpad, an orientation of the object as it contacted the touchpad, an area of the touchpad in which contact between the object and the touchpad occurred, any movement or acceleration information associated with the object as it remained in contact with the touchpad, and the like.

In some implementations, the tracking device 124 includes a dock for the input device 122, and an action may be performed in response to the input device 122 being removed from or placed back into the dock (e.g., a process for initiating an application that needs a workspace, such as writing). For example, the tracking device 124 includes an apparatus or an aperture for holding the wand (e.g., a "dock") that when the input device 122 (e.g., a pen) is connected to the apparatus or is placed within the aperture the tracking device 124 detects that the input device 122 is "docked" and may optionally charge the input device 122. Thus, when the input device 122 is moved and is disconnected to the apparatus or is moved out of the aperture the tracking device 124 detects that the input device 122 is "undocked" and then performs a process described herein to define a workspace.

Figure 2A:
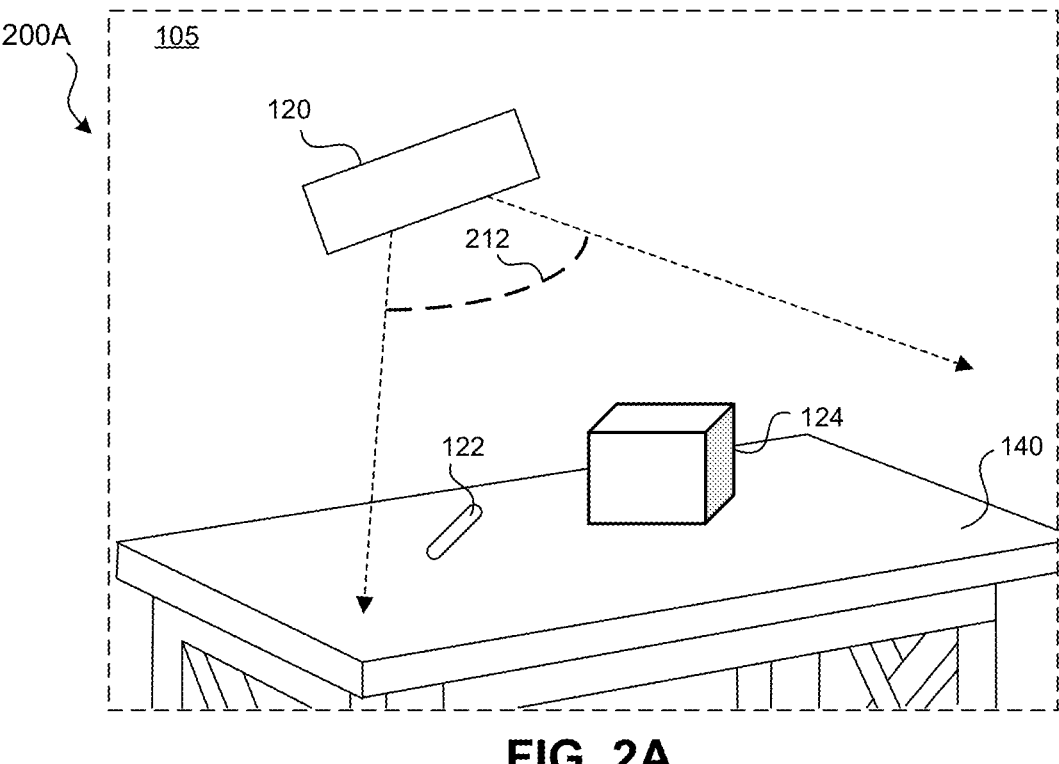
FIGS. 2A and 2B illustrate examples of a tracked input device by the electronic device of FIG. 1 in accordance with some implementations.
Figure 2B:
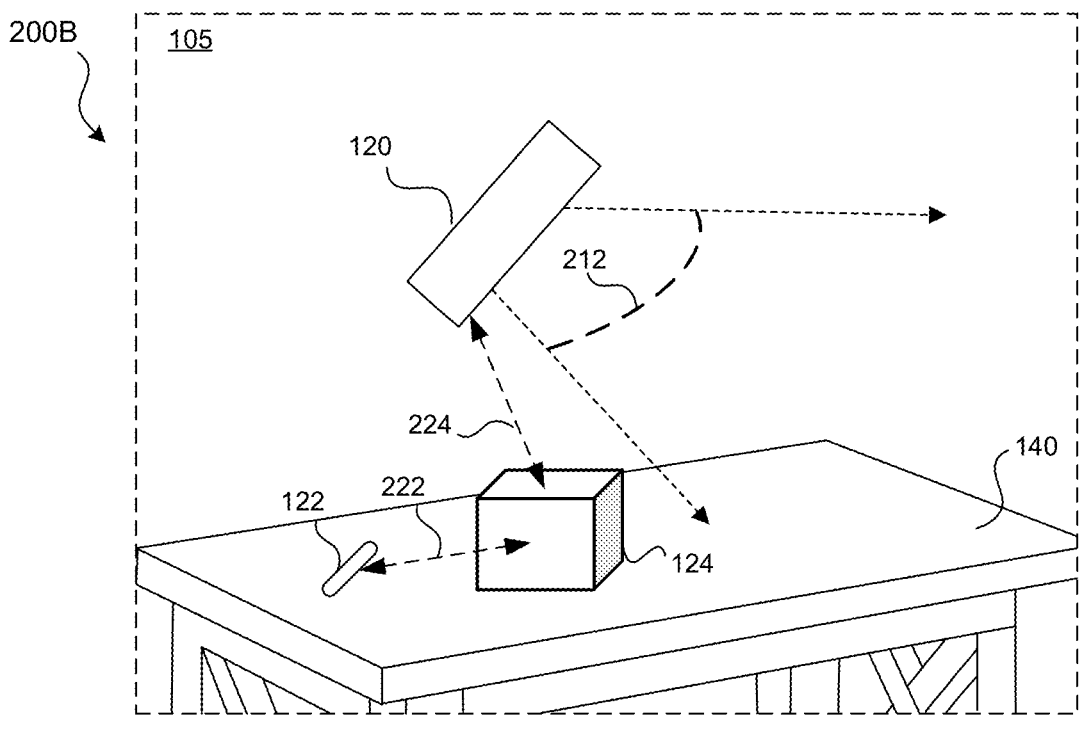

FIGS. 2A and 2B illustrate examples of a tracked input device 122 provided by the electronic device 120 of FIG. 1 in accordance with some implementations. Example environment 200A of FIG. 2A illustrates a use case where the input device 122 and the tracking device 124 are within a view 212 of the device 120. Example environment 200B of FIG. 2B illustrates a use case where the input device 122 and the tracking device 124 are each not within a view 212 of the device 120 (e.g., the user turns his or her head away while wearing an HMD). When the input device 122, tracking device 124, or both are within a view 212 of the device 120 (environment 200A), the device 120 can register its coordinate system with that of tracking device 124 and input device 122 by optically estimating the pose of one or both devices relative to electronic device 120. The tracking data 224 received from tracking device 124 represents positional data 222 (e.g., a magnetically determined position and orientation offset between tracking device 124 and input device 122) may then be used alone or in combination with optical tracking by electronic device 120 to track input device 122 or tracking device 124. For example, electronic device 120 may optically determine the pose of tracking device 124 in its coordinate system. Since tracking device 124 is known to be stationary, electronic device 120 may track input device 122 by applying the location and orientation offset between tracking device 124 and input device 122 (e.g., as defined by tracking data 224) to the optically determined pose of tracking device 124. Using tracking data 224 advantageously allows device 120 to track input device 122 with the improved precision provided by positional data 222 (e.g., magnetic tracking) without requiring magnetic sensors to be included within device 120. Additionally, tracking data 224 allows device 120 to track the pose of input device 122 and the tracking device 124 when they are not within a view 212 of the device 120 (environment 200B), which device 120 would not be able to do using optical tracking alone.

Figure 3A:
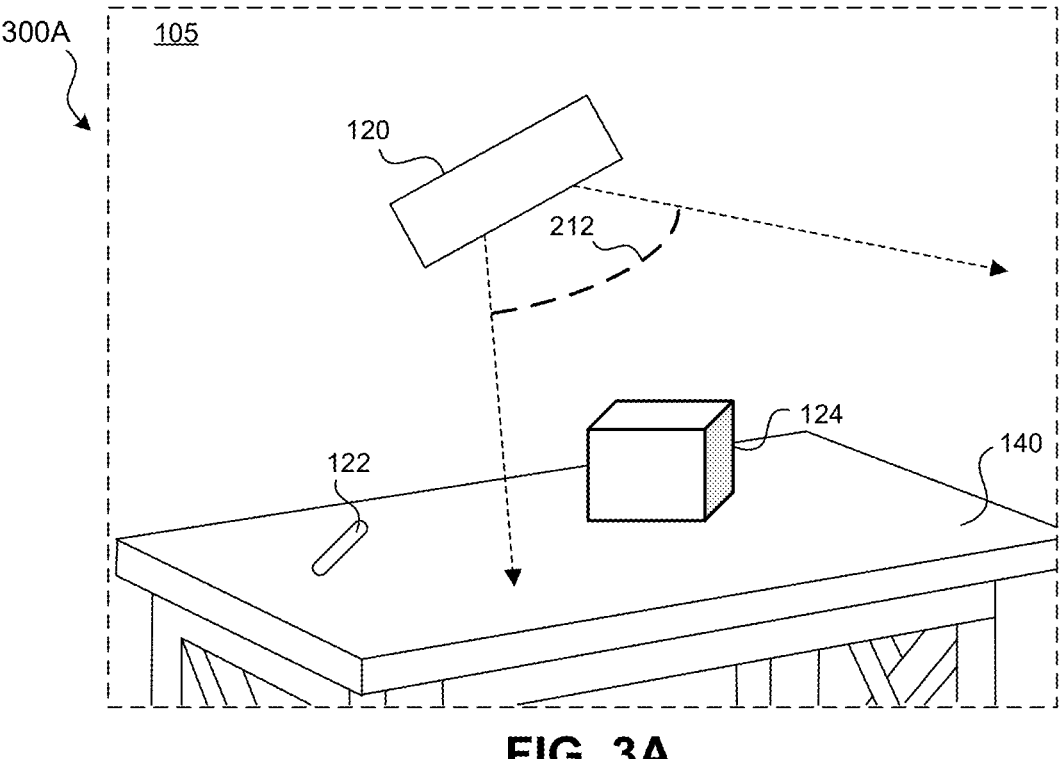
FIGS. 3A and 3B illustrate examples of re-localization by the electronic device of FIG. 1 in accordance with some implementations.
Figure 3B:
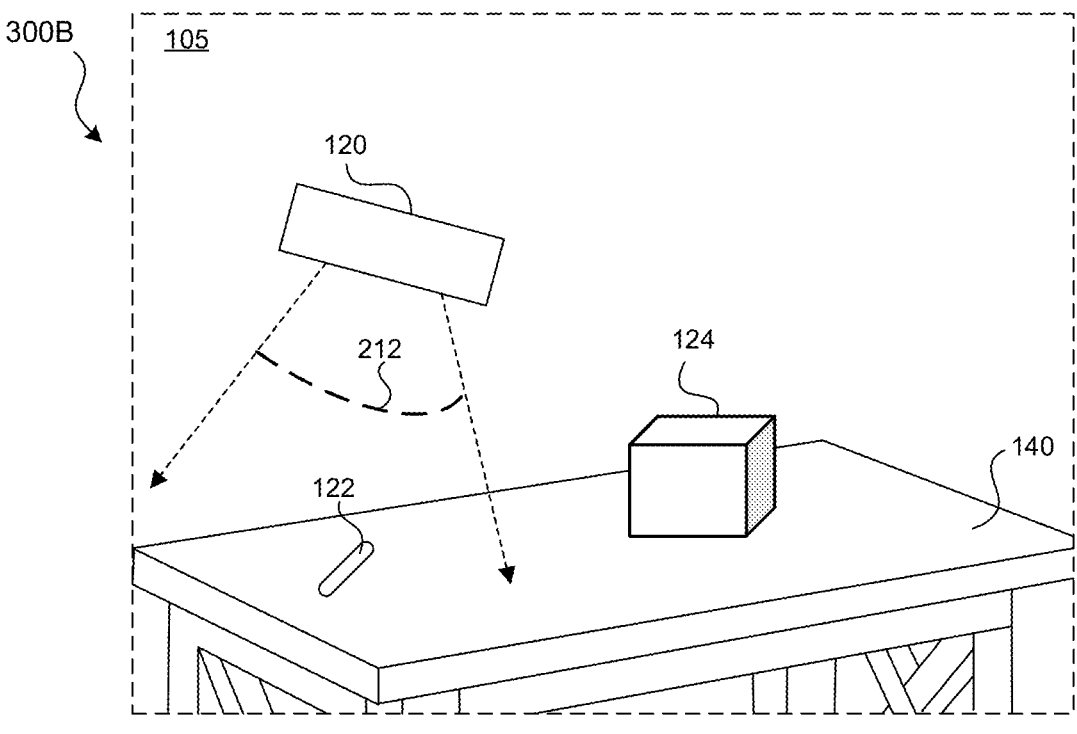

FIGS. 3A and 3B illustrate examples of re-localization by the electronic device 120 of FIG. 1 in accordance with some implementations. For example, the system may instruct a user to re-localize either the input device 122, the tracking device 124, or both because one or more of the devices have been moved and the localization needs to be updated/recalibrated. A localization instruction set can analyze image data, pose data, and the like, and/or other sources of physical environment information (e.g., camera positioning information from a camera's SLAM system, a visual inertial odometry (VIO) system, or the like) to track device location information. In particular, example environment 300A of FIG. 3A illustrates a use case where the electronic device 120 is re-localizing its coordinate system with that of input device 122 and tracking device 124 by optically estimating the pose of tracking device 124 relative to electronic device 120 (e.g. using image data) while tracking device 124 is within a view 212 of the device 120, but the input device 122 is not within view. The device 120 can then apply the location and orientation offset represented by the positional data 222 acquired by the tracking device 124 and provided via tracking data 224 to the optically determined pose of tracking device 124 to determine the pose of the input device 122. Example environment 300B of FIG. 3B illustrates a use case where the input device 122 is within a view 212 of the device 120, but the tracking device 124 is not within view, and the system is re-localizing its coordinate system with that of the input device 122 and tracking device 124 by optically estimating the pose of input device 122 relative to electronic device 120 (e.g. using image data). The device 120 can then apply the location and orientation offset represented by the positional data 222 acquired by the tracking device 124 and provided via tracking data 224 to the optically determined pose of input device 122 to determine the pose of the tracking device 124.

Figure 4A:
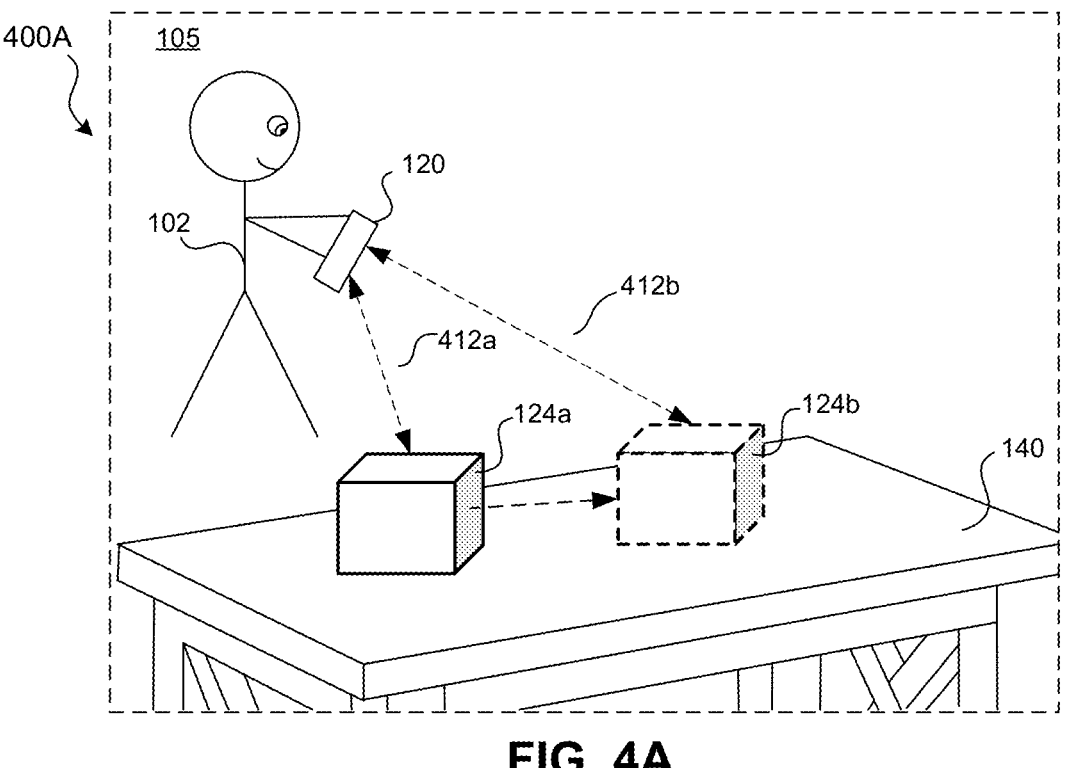
FIG. 4A illustrates an example of re-localization of a moved tracking device by the electronic device of FIG. 1 in accordance with some implementations.

FIG. 4A illustrates an example of re-localization of a moved tracking device 124 by the electronic device 120 of FIG. 1 in accordance with some implementations. In some implementations, tracking device 124 includes an accelerometer or an IMU that provides data 412a to the device 120 to determine if tracking device 124 has moved. For example, during a first period of time, after the tracking device 124a has been localized with the device 120 and the input device 122, the tracking device 124a is moved from a first position to a second position tracking device 124b for a second period of time (e.g., the user moves the tracking device to location that is more out of the way of the workspace area). The movement of the tracking device 124b is determined by the device 120 via data 412b (e.g., updated data from an accelerometer, an IMU, or the like). Alternatively, device 120 can determine that tracking device 124 has moved optically (e.g., based on acquired image data). However, if there is an occlusion (e.g., an object blocking a view of tracking device 124a/124b), then the electronic communication between tracking device 124 and device 120 would be utilized to read the accelerometer data. The electronic communications 412a and 412b between tracking device 124 and device 120 via a transmitter on the tracking device 124 may be any type of wireless communication protocol that would not be disrupted by an occluding object (e.g., WiFi, Bluetooth, Zigbee, GPS data, and the like).

Figure 4B:
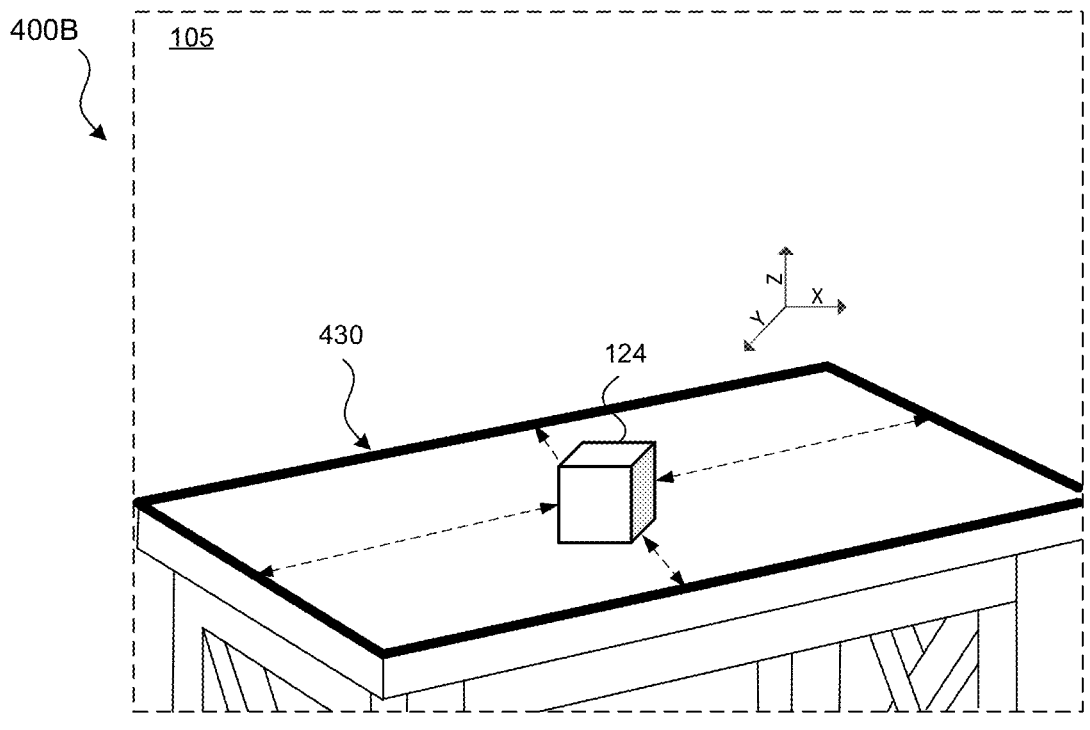
FIG. 4B illustrates an example workspace as determined by the tracking device of FIG. 1 in accordance with some implementations.

FIG. 4B illustrates an example workspace as determined by the tracking device of FIG. 1 in accordance with some implementations. In some implementations, a process includes defining a workspace (e.g., workspace area 430) that corresponds to a two-dimensional (2D) area or 3D volume of space within the physical environment. In some implementations, the 2D area or 3D volume is predefined relative to the pose of the tracking device. In some implementations, the tracking device 124 is positioned on a flat surface (e.g., table 140), and defining the workspace (e.g., workspace area 430) is based at least in part on open portions of the flat surface. For example, as illustrated in FIG. 4B, the workspace area 430 is defined at the edges of the table 140 in a 2D coordinate system. Additionally, a height of a 3D workspace (not shown) may be defined as well. Alternatively, the workspace may be a smaller predefined area on top of the surface of the table 140. For example, an application on device 120 may setup a standard workspace area depending on the application. For example, for a writing/drawing application, the workspace area 430 may be defined as a 2×2 feet square that the user can see virtually on the display of the device 120, such that when a user, using the input device 122 can see markings when the user begins to use writing motions.

In some implementations, defining the workspace is based at least in part on the determined input from the input device 122. For example, a user may drag the input device 122 across table to define workspace (e.g., workspace area 430), such as drawing shape on the table 140 to define the workspace.

In some implementations, the tracking device includes a dock for the input device, and defining the workspace is performed in response to the input device being removed from the dock. For example, the tracking device 124 includes an apparatus or an aperture for holding the wand (e.g., a "dock") that when the input device 122 (e.g., a pen) is connected to the apparatus or is placed within the aperture the tracking device 124 detects that the input device 122 is "docked". Thus, when the input device 122 is moved and is disconnected to the apparatus or is moved out of the aperture the tracking device 124 detects that the input device 122 is "undocked" and then performs a process described herein to define a workspace.

FIG. 5 is a flowchart representation of an exemplary method 500 that determines an input for an electronic device based on tracking the movement of an input device via a tracking device in accordance with some implementations. In some implementations, the method 500 is performed by a device (e.g., device 120 of FIG. 1), such as a mobile device, desktop, laptop, or server device. In some implementations, the device has a screen for displaying images and/or a screen for viewing stereoscopic images such as an HMD. In some implementations, the method 500 is performed by processing logic, including hardware, firmware, software, or a combination thereof. In some implementations, the method 500 is performed by a processor executing code stored in a non-transitory computer-readable medium (e.g., a memory). The tracking movement of an input device process of method 500 is illustrated with examples with reference to FIGS. 1-4.

At block 502, the method 500, at an electronic device having a processor, determines a pose of a tracking device in a physical environment based on first sensor data from an image sensor. For example, the electronic device may use image data from an outward facing image sensor and/or depth data to identify the relative position of the tracking device.

In some implementations, the tracking device may be designed (e.g., shaped or textured to have a distinct appearance) to be easily detectable using computer-vision. Alternatively, in some implementations, the tracking device may include a sensor that obtains data used to determine the relative position of the electronic device.

In some implementations, determining the pose of the tracking device includes determining a pose of the electronic device in the physical environment, obtaining, based at least in part on the first sensor data, second positional data corresponding to a second relative positioning between the electronic device and the tracking device in the physical environment, and determining the pose of the tracking device based at least in part on the pose of the electronic device and the second positional data.

At block 504, the method 500 receives, from the tracking device, first positional data corresponding to a first relative positioning between the tracking device and an input device (e.g., a pencil/wand) in the physical environment. The tracking device 124 may receive the data via a transmitter. The first positional data may be determined based on second sensor data obtained via a sensor on the tracking device. For example, tracking device 124 may use magnetic tracking to track the input device 122. Additionally, or alternatively, tracking device 124 may use optical tracking to track the input device 122 using on or more cameras (e.g., light intensity based cameras and/or depth cameras).

In some implementations, the input device is a stylus or another type of writing utensil (e.g., a pencil/wand). In some implementations, the input device is a wearable device. For example, input device 122 may be a hand or finger-worn device that fits on or attaches on the user 102 like a glove.

In some implementations, the first positional data represents a 6DoF pose of the input device relative to the tracking device, and the sensor on the tracking device is a magnetic tracker (e.g., three magnetic coils). In some implementations, the pose of the tracking device represents a 6DoF pose in the physical environment, and the image sensor is located on the electronic device or on the tracking device. For example, device 120 includes front facing camera's for optically tracking the input device 122. Alternatively, the tracking device 124 includes cameras that can also optically track the input device 122.

In some implementations, receiving the first positional data includes receiving updated first positional data corresponding to updated first relative positioning between the tracking device and the input device in the physical environment, and wherein tracking movement of the input device is based at least in part on the updated first positional data and the pose of the tracking device. For example, the first positional data may include an offset between the tracking device 124 and the input device 122 such that when the input device 122 is moved to a different location, the positional data (e.g., offset information) is updated.

At block 506, the method 500 tracks movement of the input device (e.g., pencil) in the physical environment based at least in part on the first positional data and the pose of the tracking device. For example, as the user moves the input device 122 for a drawing application, the device 120 tracks the movement using positional data (e.g., magnetic tracking) from the tracking device 124.

At block 508, the method 500 determines an input for the electronic device based at least in part on tracking the movement of the input device. For example, as the user moves the input device 122 for a drawing application, the device 120 determines the intended input of the user with the input device (e.g., what the user is drawing), based on the tracked movement using positional data (e.g., magnetic tracking) from the tracking device 124.

In some implementations, the tracking device (tracking device 124) is stationary and/or positioned on a flat surface, such as a desk (e.g., table 140). In some implementations, the tracking device (tracking device 124) is stationary during the tracking and the electronic device (e.g., device 120) is not stationary during the tracking. For example, the user 102 moves to a different position around the workspace area of table 140, thus, since the user is wearing device 120 (e.g., an HMD), the position of the device 120 is moved.

In some implementations, tracking the movement of the input device includes during a first period during which the tracking device is visible in third sensor data obtained via a sensor of the electronic device and the input device is not visible in the third sensor data, tracking the movement of the input device based on identifying the tracking device in the third sensor data, and during a second period during which the tracking device is not visible in the third sensor data and the input device is visible in the third sensor data, tracking the movement of the input device based on identifying the input device in the third sensor data. For example, as illustrated in FIG. 3A, during a first instant of time, the tracking device 124 (e.g., the docking station) is within a view of the HMD (e.g., device 120) and the input device 122 is not, thus the input device 122 is tracked by device 120 based on the offset data received from the tracking device 124. Then, as illustrated in FIG. 3B, during a second instant of time, the tracking device 124 (e.g., the docking station) is not within a view of the HMD (e.g., device 120) and the input device 122 is, thus the input device 122 is tracked by device 120 based on the previously known position of tracking device 124 and the offset data received from the tracking device 124, image data from an image sensor on device 120 (e.g., via optical tracking), or both.

In some implementations, the method 500 further detects a change in the pose of the tracking device, and in accordance with detecting the change in the pose, determining an updated pose of the tracking device in the physical environment based on fourth sensor data from the image sensor. For example, as illustrated in FIG. 4A, if the tracking device 124 is moved to a new location, that movement can be detected by the device 120 via an image sensor in order to optically track the fourth sensor data from the image sensor. For example, as illustrated in FIG. 4A, if the tracking device 124 by the device 120. In some implementations, in response to detecting a change in the pose of the tracking device, a notification may be presented to the user to re-localize the electronic device with the tracking device. For example, a visual or auditory notification may be presented that instructs the user to position the electronic device such that the tracking device is within a field of view of the image sensor.

In some implementations, the tracking device 124 includes an accelerometer or an IMU and detecting the change in the pose of the tracking device includes receiving, from the tracking device, an indication that the tracking device has moved based on sensor data from the accelerometer or the IMU. For example, if in FIG. 4A the tracking device 124 is occluded from a view of an image sensor of the device 120 and the tracking device 124 is moved, an internal sensor (e.g., an IMU, accelerometer, or the like) can indicate such movement to the device 120 via a transmitter.

In some implementations, the method 500 further includes defining a workspace, wherein the workspace corresponds to a 2D area 3D volume of space within the physical environment. In some implementations, the 2D area or 3D volume is predefined relative to the pose of the tracking device. In some implementations, the tracking device 124 is positioned on a flat surface (e.g., table 140), and defining the workspace (e.g., workspace area 430) is based at least in part on open portions of the flat surface. For example, as illustrated in FIG. 4B, the workspace area 430 is defined at the edges of the table 140 in a 2D coordinate system. Additionally, a height of a 3D workspace (not shown) may be defined as well. Alternatively, the workspace may be a smaller predefined area on top of the surface of the table 140. For example, an application on device 120 may setup a standard workspace area depending on the application. For example, for a writing/drawing application, the workspace area 430 may be defined as a 2×2 feet square that the user can see virtually on the display of the device 120, such that when a user, using the input device 122 can see markings when the user begins to use writing motions.

In some implementations, defining the workspace is based at least in part on the determined input from the input device 122. For example, a user may drag the input device 122 across table to define workspace (e.g., workspace area 430), such as drawing a shape on the table 140 to define the workspace.

In some implementations, the tracking device includes a dock for the input device, and defining the workspace is performed in response to the input device being removed from the dock. For example, the tracking device 124 includes an apparatus or an aperture for holding the wand (e.g., a "dock") that when the input device 122 (e.g., a pen) is connected to the apparatus or is placed within the aperture the tracking device 124 detects that the input device 122 is "docked". Thus, when the input device 122 is moved and is disconnected to the apparatus or is moved out of the aperture the tracking device 124 detects that the input device 122 is "undocked" and then performs a process described herein to define a workspace.

In some implementations, the tracking device includes a case for the input device, and defining the workspace is performed in response to the case being opened. For example, the input device 122 (e.g., a pen) includes a carrying case (e.g., a pen holder) that when the input device 122 is moved out of the case, the device 120 and/or the tracking device 124 detects that the case of the input device 122 is opened, and then performs a process described herein to define a workspace.

In some implementations, the tracking device is a flexible mat, and defining the workspace is performed in response to the mat being unrolled. For example, the tracking device 124 may be a capacitive based flexible nearly flat mat (or pad) that may include functional buttons, slidebars, and the like. The tracking device 124 as a flexible mat may then be "activated" by unrolling it such that the device 120 detects the tracking device 124 is unrolled, then performs a process described herein to define a workspace. In some implementations, the flexible mat includes a touch sensor, and the method 500 further includes determining a second input for the electronic device based on sensor data from the touch sensor. For example, the tracking device 124 as a flexible mat can detect when a user touches the mat to sense a user writing either with the input device 122 or by the touch of the user.

In some implementations, the method 500 further includes providing an XR environment on a display of the device. In some implementations, the XR environment includes content (e.g., virtual content) and/or enables input based on the workspace. For example, an application may allow a user to create 2D or 3D virtual objects within the workspace area 430 by drawing the object with the input device 122, such as a virtual 3D printing pen.

While described above as being transmitted by tracking device 124, the positional data may instead by transmitted by input device 122 to electronic device 120. Additionally, tracking device 124 may instead track input device 122, electronic device 120, or both, using optical tracking and electronic device 120 may instead track input device 122 or tracking device 124 using magnetic tracking. In these implementations, electronic device 120 may determine the pose of input device 122 or tracking device 124 by combining the magnetically determined pose of one device with the optically determined location and orientation offset between input device 122 and tracking device 124.

Figure 6:
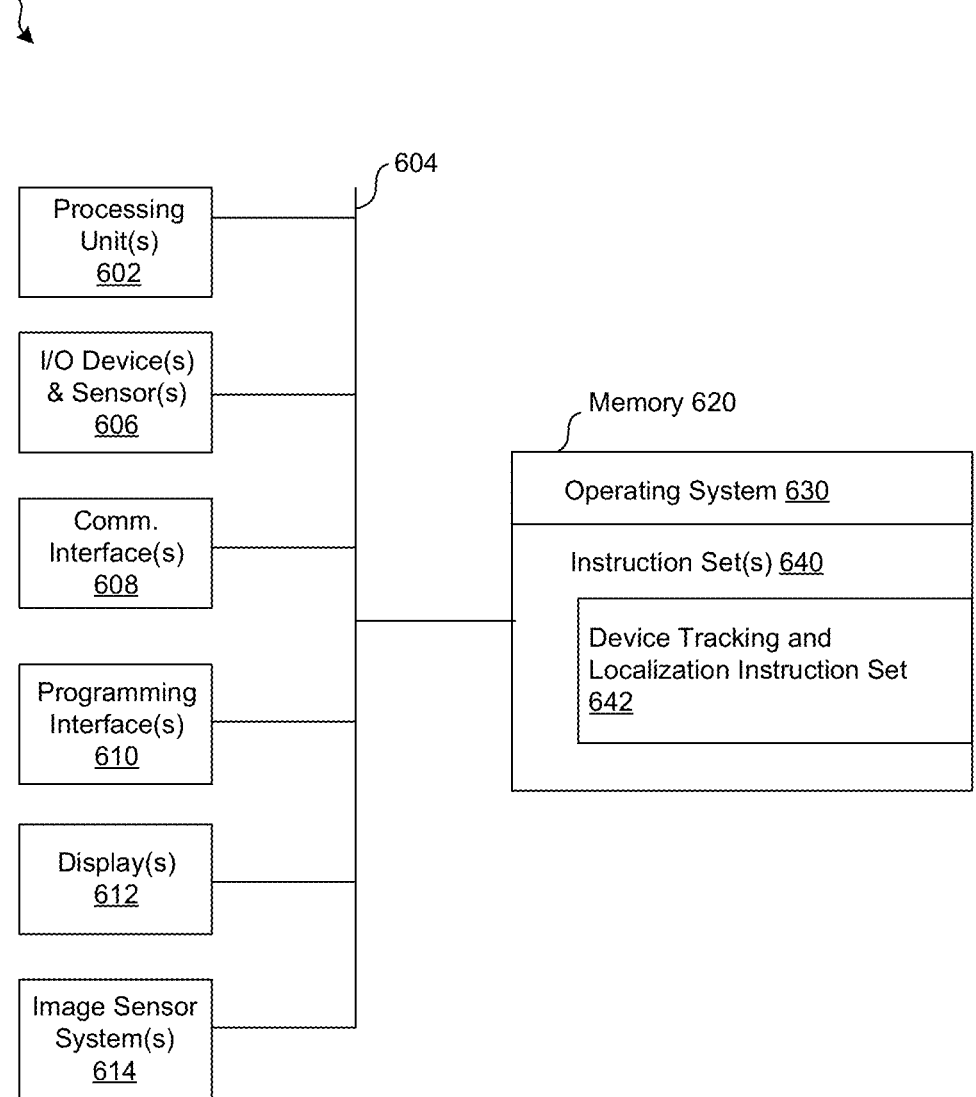
FIG. 6 is an example of an electronic device in accordance with some implementations.

FIG. 6 is a block diagram of an example device 600. Device 600 illustrates an exemplary device configuration for device 120 of FIG. 1. Additionally, device 600 illustrates an exemplary device configuration for tracking device 124, although some components may not be used (e.g., a display) by the tracking device 124 in an exemplary implementation. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 600 includes one or more processing units 602 (e.g., microprocessors, ASICs, FPGAs, GPUs, CPUs, processing cores, and/or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 610, one or more displays 612, one or more interior and/or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 612 are configured to present a view of a physical environment or a graphical environment to the user. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 612 correspond to diffractive, reflective, polarized, holographic, etc. waveguide displays. In one example, the device 600 includes a single display. In another example, the device 600 includes a display for each eye of the user.

In some implementations, the one or more image sensor systems 614 are configured to obtain image data that corresponds to at least a portion of the physical environment 105. For example, the one or more image sensor systems 614 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 614 further include illumination sources that emit light, such as a flash. In various implementations, the one or more image sensor systems 614 further include an on-camera image signal processor (ISP) configured to execute a plurality of processing operations on the image data.

In some implementations, the device 600 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 600 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 600.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 includes a non-transitory computer readable storage medium.

In some implementations, the memory 620 or the non-transitory computer readable storage medium of the memory 620 stores an optional operating system 630 and one or more instruction set(s) 640. The operating system 630 includes procedures for handling various basic system services and for performing hardware dependent tasks. In some implementations, the instruction set(s) 640 include executable software defined by binary information stored in the form of electrical charge. In some implementations, the instruction set(s) 640 are software that is executable by the one or more processing units 602 to carry out one or more of the techniques described herein.

The instruction set(s) 640 includes a device tracking and localization instruction set 642. The instruction set(s) 640 may be embodied as a single software executable or multiple software executables.

In some implementations, the device tracking and localization instruction set 642 is executable by the processing unit(s) 602 to obtain sensor data (e.g., light intensity image data, depth data, etc.) and track a location of a moving device in a 3D coordinate system (e.g., the input device 122) using one or more of the techniques disclosed herein. For example, the device tracking and localization instruction set 642 analyzes image data, pose data, and the like, and/or other sources of physical environment information (e.g., camera positioning information from a camera's SLAM system, a visual inertial odometry (VIO) system, or the like) to track device location information.

Although the instruction set(s) 640 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 7:
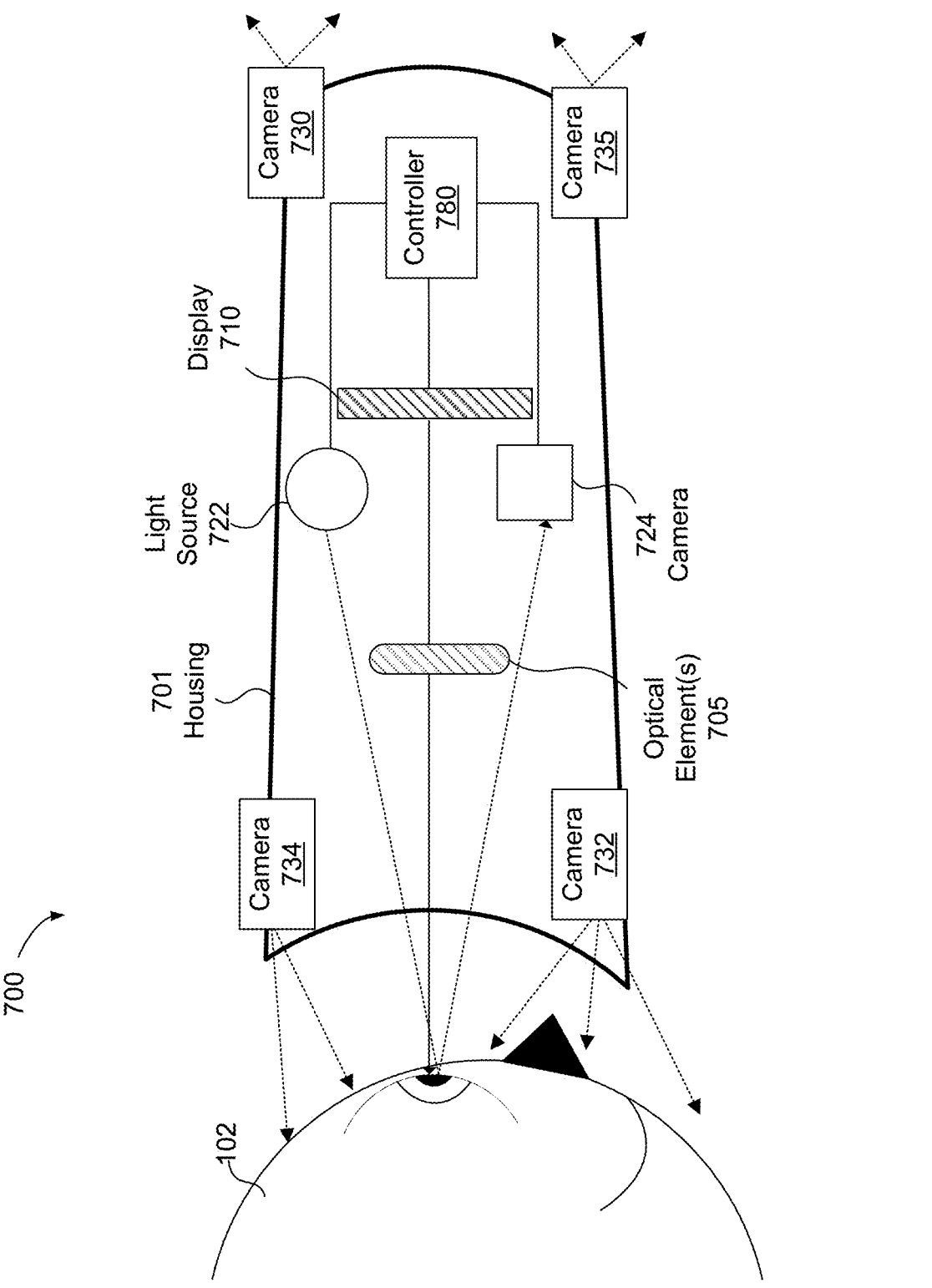
FIG. 7 illustrates an example head-mounted device (HMD) in accordance with some implementations.

FIG. 7 illustrates a block diagram of an exemplary head-mounted device 700 in accordance with some implementations. The head-mounted device 700 includes a housing 701 (or enclosure) that houses various components of the head-mounted device 700. The housing 701 includes (or is coupled to) an eye pad (not shown) disposed at a proximal (to the user 102) end of the housing 701. In various implementations, the eye pad is a plastic or rubber piece that comfortably and snugly keeps the head-mounted device 700 in the proper position on the face of the user 102 (e.g., surrounding the eye of the user 102).

The housing 701 houses a display 710 that displays an image, emitting light towards or onto the eye of a user 102. In various implementations, the display 710 emits the light through an eyepiece having one or more optical elements 705 that refracts the light emitted by the display 710, making the display appear to the user 25 to be at a virtual distance farther than the actual distance from the eye to the display 710. For example, optical element(s) 705 may include one or more lenses, a waveguide, other diffraction optical elements (DOE), and the like. For the user 25 to be able to focus on the display 710, in various implementations, the virtual distance is at least greater than a minimum focal distance of the eye (e.g., 6 cm). Further, in order to provide a better user experience, in various implementations, the virtual distance is greater than 1 meter.

The housing 701 also houses a tracking system including one or more light sources 722, camera 724, camera 730, camera 732, camera 734, camera 735, and a controller 780. The one or more light sources 722 emit light onto the eye of the user 102 that reflects as a light pattern (e.g., a circle of glints) that can be detected by the camera 724. Based on the light pattern, the controller 780 can determine an eye tracking characteristic of the user 102. For example, the controller 780 can determine a gaze direction and/or a blinking state (eyes open or eyes closed) of the user 102. As another example, the controller 780 can determine a pupil center, a pupil size, or a point of regard. Thus, in various implementations, the light is emitted by the one or more light sources 722, reflects off the eye of the user 102, and is detected by the camera 724. In various implementations, the light from the eye of the user 102 is reflected off a hot mirror or passed through an eyepiece before reaching the camera 724.

The display 710 emits light in a first wavelength range and the one or more light sources 722 emit light in a second wavelength range. Similarly, the camera 724 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 102 selects an option on the display 710 by looking at it), provide foveated rendering (e.g., present a higher resolution in an area of the display 710 the user 102 is looking at and a lower resolution elsewhere on the display 710), or correct distortions (e.g., for images to be provided on the display 710).

In various implementations, the one or more light sources 722 emit light towards the eye of the user 102 which reflects in the form of a plurality of glints.

In various implementations, the camera 724 is a frame/shutter-based camera that, at a particular point in time or multiple points in time at a frame rate, generates an image of the eye of the user 102. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 724 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, head-mounted device 700 includes internally facing sensors (e.g., camera 732 and camera 734) for capturing information from inside of the head-mounted device 700 (or towards the face of the user 102) and can generate an image of the face of the user 102. For example, camera 732 captures images of the user's face below the eyes, and camera 734 captures images of the user's face above the eyes. The images captured by camera 732 and camera 734 may include light intensity images (e.g., RGB) and/or depth image data (e.g., time-of-flight, infrared, etc.).

In various implementations, head-mounted device 700 includes externally facing sensors (e.g., camera 730 and camera 735) for capturing information from outside of the head-mounted device 700. For example, to capture image data of the physical environment that the user 102 is viewing. The image data can include light intensity image data and/or depth data. For example, camera 730 may be a video camera for capturing RGB data, and camera 735 may be a depth sensor (e.g., a structured light, a time-of-flight, or the like) for capturing depth data.

People may sense or interact with a physical environment or world without using an electronic device. Physical features, such as a physical object or surface, may be included within a physical environment. For instance, a physical environment may correspond to a physical city having physical buildings, roads, and vehicles. People may directly sense or interact with a physical environment through various means, such as smell, sight, taste, hearing, and touch. This can be in contrast to an extended reality (XR) environment that may refer to a partially or wholly simulated environment that people may sense or interact with using an electronic device. The XR environment may include virtual reality (VR) content, mixed reality (MR) content, augmented reality (AR) content, or the like. Using an XR system, a portion of a person's physical motions, or representations thereof, may be tracked and, in response, properties of virtual objects in the XR environment may be changed in a way that complies with at least one law of nature. For example, the XR system may detect a user's head movement and adjust auditory and graphical content presented to the user in a way that simulates how sounds and views would change in a physical environment. In other examples, the XR system may detect movement of an electronic device (e.g., a laptop, tablet, mobile phone, or the like) presenting the XR environment. Accordingly, the XR system may adjust auditory and graphical content presented to the user in a way that simulates how sounds and views would change in a physical environment. In some instances, other inputs, such as a representation of physical motion (e.g., a voice command), may cause the XR system to adjust properties of graphical content.

Numerous types of electronic systems may allow a user to sense or interact with an XR environment. A non-exhaustive list of examples includes lenses having integrated display capability to be placed on a user's eyes (e.g., contact lenses), heads-up displays (HUDs), projection-based systems, head mountable systems, windows or windshields having integrated display technology, headphones/earphones, input systems with or without haptic feedback (e.g., handheld or wearable controllers), smartphones, tablets, desktop/laptop computers, and speaker arrays. Head mountable systems may include an opaque display and one or more speakers. Other head mountable systems may be configured to receive an opaque external display, such as that of a smartphone. Head mountable systems may capture images/video of the physical environment using one or more image sensors or capture audio of the physical environment using one or more microphones. Instead of an opaque display, some head mountable systems may include a transparent or translucent display. Transparent or translucent displays may direct light representative of images to a user's eyes through a medium, such as a hologram medium, optical waveguide, an optical combiner, optical reflector, other similar technologies, or combinations thereof. Various display technologies, such as liquid crystal on silicon, LEDs, uLEDs, OLEDs, laser scanning light source, digital light projection, or combinations thereof, may be used. In some examples, the transparent or translucent display may be selectively controlled to become opaque. Projection-based systems may utilize retinal projection technology that projects images onto a user's retina or may project virtual content into the physical environment, such as onto a physical surface or as a hologram.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at an electronic device comprising a processor:
    determining a pose of a tracking device in a physical environment based on first sensor data from an image sensor attached to the electronic device;
    receiving, from the tracking device, first positional data corresponding to a first relative positioning between the tracking device and an input device in the physical environment, wherein the first positional data is determined based on second sensor data obtained via a sensor on the tracking device;
    tracking movement of the input device in the physical environment based at least in part on the first positional data and the pose of the tracking device; and
    determining an input for the electronic device based at least in part on tracking the movement of the input device.

2. The method of claim 1, wherein the first positional data represents a 6 degrees of freedom pose of the input device relative to the tracking device, and wherein the sensor on the tracking device comprises a magnetic tracker.

3. The method of claim 1, wherein the pose of the tracking device represents a 6 degrees of freedom pose in the physical environment, and wherein the image sensor is located on the electronic device or on the tracking device.

4. The method of claim 1, wherein determining the pose of the tracking device comprises:
    determining a pose of the electronic device in the physical environment;
    obtaining, based at least in part on the first sensor data, second positional data corresponding to a second relative positioning between the electronic device and the tracking device in the physical environment; and
    determining the pose of the tracking device based at least in part on the pose of the electronic device and the second positional data.

5. The method of claim 1, wherein receiving the first positional data comprises receiving updated first positional data corresponding to updated first relative positioning between the tracking device and the input device in the physical environment, and wherein tracking movement of the input device is based at least in part on the updated first positional data and the pose of the tracking device.

6. The method of claim 1, wherein the tracking device is stationary during the tracking and the electronic device is not stationary during the tracking.

7. The method of claim 1, wherein tracking the movement of the input device comprises:
    during a first period during which the tracking device is visible in third sensor data obtained via a sensor of the electronic device and the input device is not visible in the third sensor data, tracking the movement of the input device based on identifying the tracking device in the third sensor data; and
    during a second period during which the tracking device is not visible in the third sensor data and the input device is visible in the third sensor data, tracking the movement of the input device based on identifying the input device in the third sensor data.

8. The method of claim 1, further comprising:
    detecting a change in the pose of the tracking device; and
    in accordance with detecting the change in the pose, determining an updated pose of the tracking device in the physical environment based on fourth sensor data from the image sensor.

9. The method of claim 8, wherein the tracking device comprises an accelerometer or an inertial measurement unit (IMU), and wherein detecting the change in the pose of the tracking device comprises receiving, from the tracking device, an indication that the tracking device has moved based on sensor data from the accelerometer or the IMU.

10. The method of claim 1, further comprising:
defining a workspace, wherein the workspace corresponds to a two-dimensional (2D) area or three-dimensional (3D) volume of space within the physical environment.

11. The method of claim 10, wherein defining the workspace is based at least in part on the determined input.

12. The method of claim 10, wherein the 2D area or 3D volume is predefined relative to the pose of the tracking device.

13. The method of claim 10, wherein the tracking device is positioned on a flat surface, and wherein defining the workspace is based at least in part on open portions of the flat surface.

14. The method of claim 10, wherein the tracking device comprises a dock for the input device, and wherein defining the workspace is performed in response to the input device being removed from the dock.

15. The method of claim 10, wherein the tracking device comprises a case for the input device, and wherein defining the workspace is performed in response to the case being opened.

16. The method of claim 10, wherein the tracking device comprises a flexible mat, and wherein defining the workspace is performed in response to the mat being unrolled.

17. The method of claim 16, wherein the mat comprises a touch sensor, and wherein the method further comprises determining a second input for the electronic device based on sensor data from the touch sensor.

18. The method of claim 10, further comprising:
providing an extended reality (XR) environment, the XR environment presenting content or enabling input based on the workspace.

19. The method of claim 1, wherein the electronic device is a head mounted device (HMD).

20. The method of claim 1, wherein the input device comprises a stylus or a wearable device.

21. An electronic device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
determining a pose of a tracking device in a physical environment based on first sensor data from an image sensor attached to the electronic device;
receiving, from the tracking device, first positional data corresponding to a first relative positioning between the tracking device and an input device in the physical environment, wherein the first positional data is determined based on second sensor data obtained via a sensor on the tracking device;
tracking movement of the input device in the physical environment based at least in part on the first positional data and the pose of the tracking device; and
determining an input for the electronic device based at least in part on tracking the movement of the input device.

22. A non-transitory computer-readable storage medium, storing program instructions executable by one or more processors of an electronic device to perform operations comprising:
determining a pose of a tracking device in a physical environment based on first sensor data from an image sensor attached to the electronic device;
receiving, from the tracking device, first positional data corresponding to a first relative positioning between the tracking device and an input device in the physical environment, wherein the first positional data is determined based on second sensor data obtained via a sensor on the tracking device;
tracking movement of the input device in the physical environment based at least in part on the first positional data and the pose of the tracking device; and
determining an input for the electronic device based at least in part on tracking the movement of the input device.

* * * * *